Sept. 26, 1961 M. F. JOHNSON 3,001,813
VEHICULAR CAMPING TRAILERS
Filed Dec. 19, 1958 2 Sheets-Sheet 1

INVENTOR.
MAURICE F. JOHNSON
BY
ATTORNEY

Sept. 26, 1961 M. F. JOHNSON 3,001,813
VEHICULAR CAMPING TRAILERS
Filed Dec. 19, 1958 2 Sheets-Sheet 2

INVENTOR.
MAURICE F. JOHNSON
BY
ATTORNEY

United States Patent Office 3,001,813
Patented Sept. 26, 1961

3,001,813
VEHICULAR CAMPING TRAILERS
Maurice F. Johnson, 6820 Auto Club Road,
Minneapolis, Minn.
Filed Dec. 19, 1958, Ser. No. 781,756
2 Claims. (Cl. 296—23)

The principal object of the invention is to provide a relatively light, rugged trailer type unit which may be compactly folded for over the road towing and the superstructure erected for occupancy in a matter of minutes by one person.

Another object of this invention is to provide a unitary vehicular trailer of the class described having a floor plan that affords a sleeping section, a dining section and a storage section all of which with certain limitation are available for simultaneous use.

A further object of this invention is to provide a trailer of the class described having ample storage for luggage and equipment for outdoor living and the like when the same is folded for over the road towing.

A further object of this invention is to provide a trailer of the class described which when the superstructure is erected for occupancy affords ample head room at its center for an adult to stand and is further provided with front and rear ventilated snap or closures.

These and other objects of the invention will become apparent from the following specification and claims when taken in conjunction with the appended drawings which form a part of this application and in which drawings, like characters indicate like parts throughout the several views.

To the above end, generally stated, the invention consists of the following devices and combination of devices hereinafter described and defined in the claims.

Referring to the drawings.

Figure 1:
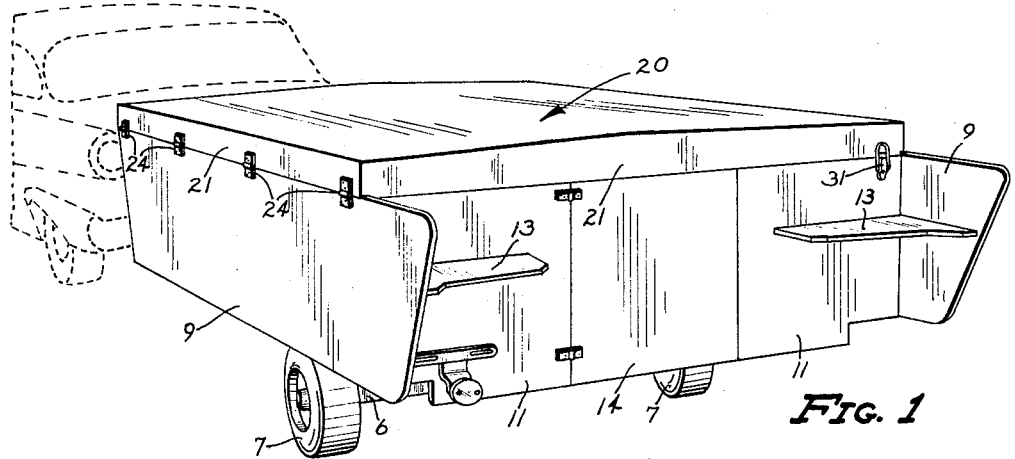
FIG. 1 is a perspective view of the invention folded for over the road towing, the towing vehicle being indicated by broken lines.
Figure 2:
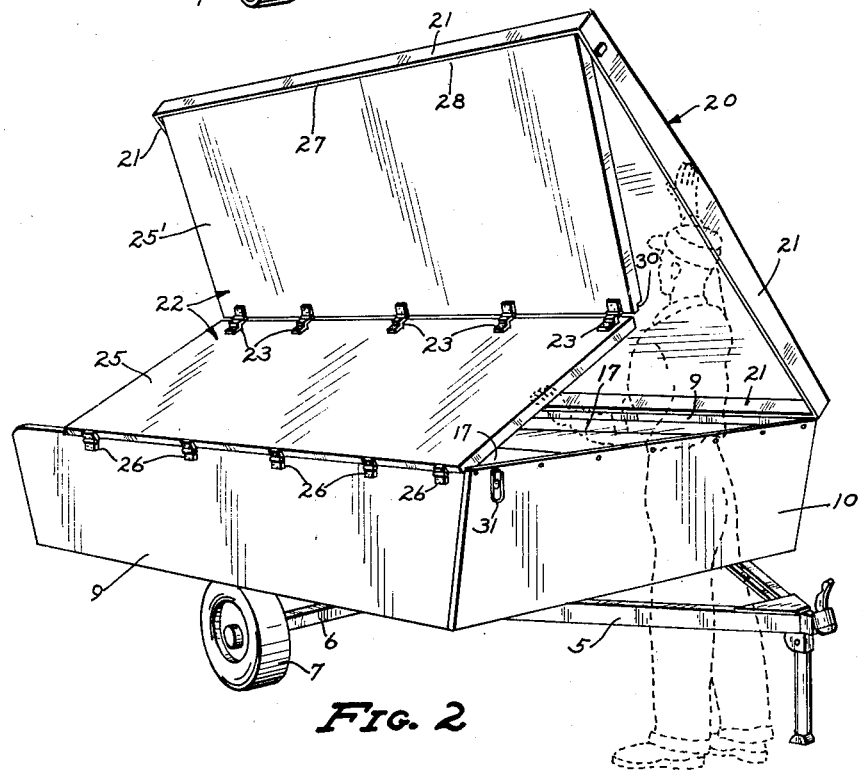
FIG. 2 is a perspective view of the invention its position reversed endwise from that of FIG. 1 showing the superstructure partially erected.
Figure 3:
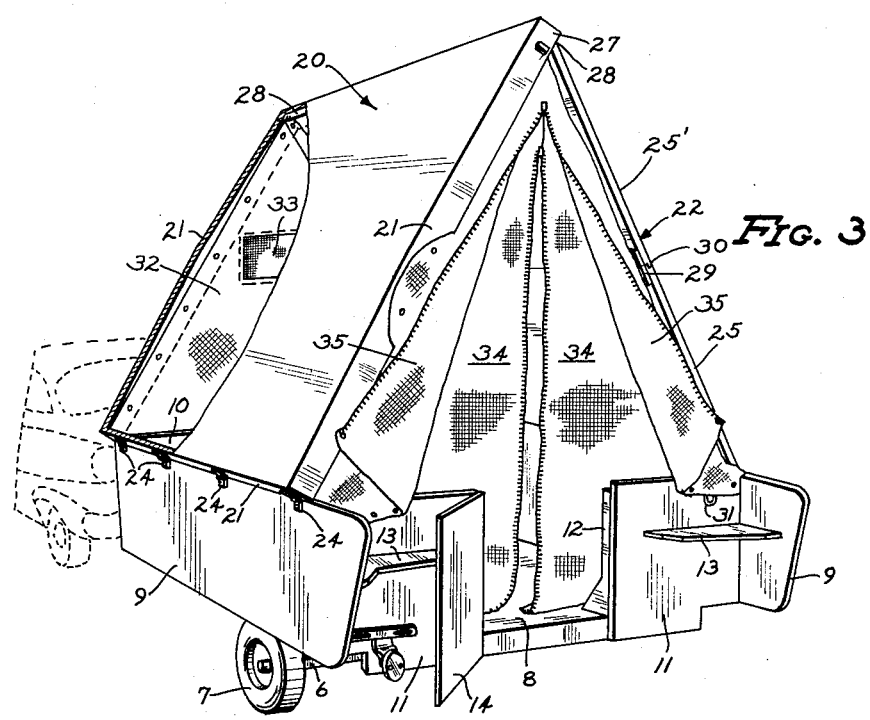
FIG. 3 is a perspective view of the invention with the superstructure erected for use.

The numeral 5 is directed to a conventional steel channel A frame mounted on a wheeled axle 6 the wheels thereof being provided with high speed type pneumatic tires 7. The trailer proper comprises a bed 8 of watertight construction that is securely mounted on the frame and axle assembly 5 and 6 respectively. The bed 8 is of sufficient width as to overlie the tires 7 mounted on the wheeled axle 6. It is to be understood that suitable splash guards, not shown, are provided on the underside of the bed 8 above the tires 7.

A pair of upstanding side panel members 9 are rigidly secured to the trailer bed 8 and a front panel 10 connects the side panels 9 to close the forward end portion of the trailer body proper. The side panels 9 extend rearwardly beyond the end of the trailer bed 8 to enhance the appearance of the trailer body by giving added length thereto and are functional as well as will presently become apparent. The rear end portion of the trailer body proper is closed by means of a pair of upstanding panels 11 that are rigidly secured at the outer end portions thereof, to the respective side panels 9 and at the inner end portion thereof to upstanding brackets 12 that are rigidly secured to the trailer bed 8. A pair of horizontally disposed shelves 13 are attached to the rearward extension of the side panels 9 and the outer surface of the respective rear panels 11 of the trailer body proper and affords a pair of convenient shelves for general use. The rear end panels 11 are terminated at either side of the transverse center of the trailer bed 8 and a hinged door 14 is provided to afford easy access to the interior of the trailer and close the space between the respective inner end portions of the rear pair of panels 11. It will be understood that suitable latch mechanism is provided to lock the door 14 in its closed position and similarly close the rear end portion of the trailer body proper.

Figure 4:
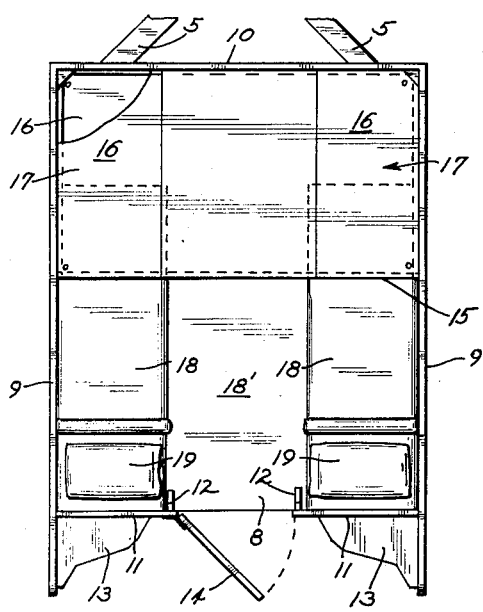
FIG. 4 is a floor plan of the trailer body.

With reference to the floor plan of the trailer body proper, it is important to note that a primary sleeping area platform 15 using sheet plywood as a supporting surface 15' for a mattress see numeral 17, is raised above the level of the bed 8 of the trailer and affords a large amount of storable space 16 therebeneath, see the broken away corner section of FIG. 4. A pair of upswinging or removable access doors 16' are formed in the outer edge portions of the support 15' for the mattress 17, affords easy access to said storage space 16.

The unit is capable of sleeping four or five persons, two or three of whom sleep on the mattress 17 supported on the sleeping area platform 15 and the remainder of the sleeping occupants on the floor mattresses 18 placed on the bed 8 of the trailer in the dining area 18'. In actual use it has been found best for the said occupants of the floor mattresses 18 to sleep with the head resting on pillows 19 placed adjacent the forward end portion of the trailer with their feet extending under the raised sleeping area platform 15, the outer end of which is open.

A multiple folding superstructure which, in its raised position, affords a roof for the trailer body proper, comprises a solid Fiberglas panel 20 having downturned edge portions 21. An apposing Fiberglas panel 22 is longitudinally divided approximately at the transverse center thereof and hinged, see numeral 23, and dimensioned to fold inwardly and be covered by the solid panel 20 and its downturned edge portions 21. From the foregoing it will be understood that the area of the solid panel 20 and the folding panel 22 are so dimensioned that the said folding panel fits within the confines of the downturned edge portions 21 of the solid panel 20 with a close working fit.

The solid roof panel section 20 is hingedly mounted along the upper edge portion of the left hand panel section 9 by a long continuous panel hinge 24, as is the lower section 25 of the hinged panel 22 also mounted by means of an identical panel hinge 26, to the upper edge portion of the right hand side panel member 9. The upper end portions of the respective panel members 20 and 22 are also hingedly connected at the apex of the roof within the confines of the downturned edge portions 21 of the solid panel 20, said hinges not being shown.

Figure 5:
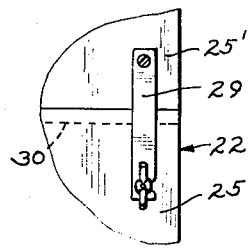
FIG. 5 is a detailed view on an enlarged scale of the latch bar employed to hold the superstructure erected.

As illustrated in FIG. 5 a plurality of latch bars 29 are mounted on the underside of the hinged roof panel 22 and designed to span the abutting edges of the sectional divisions 25 and 25' of the hinged roof panel 22, and are manually locked to thus hold the same against normal folding movements when the superstructure is erected for occupancy.

It is further important to note that the hinges 24 and 26 are of the off-set strap type and are mounted in such a manner as to project the eaves or lower edge portions of the roof panel members 20 and 22 outwardly of the perpendicular side panel member 9 to thus provide roof drainage. The same is true in the structure embodied in the sectional hinged roof panel 22 in which case the hinges 23 are also of the off-set type and mounted in such a manner that an overhanging lip 30 on the lower edge portion of the upper section 25' of the hinged roof panel 22 will overlie the upper edge portion of the section 25 of said hinged roof panel 22 thereby affording a water-tight joint between section 25 and 25' of said roof panel 22.

With the door 14 in closed position, and the latch bar members 29 released to permit the folding of the panel 22 upon itself, the solid roof panel section 20 is permitted to move downwardly into close water-tight abutting engagement between the lower edge portion of the downturned edge portion 21 of the panel section 20 and the upper edge portion of the side panels 9 of the trailer body proper; the front panel 10, the spaced rear panels 11, and the door 14 when the same is in closed position. It will be understood that any suitable connection between these abutting surfaces may be employed to establish a joint that is both waterproof and dustproof when the superstructure is in folded position for over the road transport.

A pair of trunk or luggage type latches 31 having a bail and lever on the right hand side of the front and rear body panels 10 and 11 cooperate with its aligned catch member secured to the front and rear downturned edge portions of the solid roof panel 20 to draw the said roof panel into close abutting engagement with the upper edge portions of the said upstanding side front and rear panels of the trailer body proper.

Being of Fiberglas construction, the superstructure is capable of being produced to afford a relatively light weight but still be very strong. Said superstructure is easily erected and similarly folded in a very few minutes by a single person. In this connection it is interesting to note that from a functional standpoint when the superstructure assembly is released from its supporting latch mechanism 22 and the folding movements commenced, the operator may release all hold on the assembly and permit the same to drop by force of gravity into its closed position. An air cushion is held trapped in the trailer body proper and the solid roof panel 20 and after the initial drop, the combined, hingedly connected member will settle slowly into position as the trapped air cushion escapes slowly. This is highly important as it is practically impossible, because of this air cushion to become injured or pinched as the folding superstructure members move into position on the said trailer body proper.

The front end portion of the erected unit is closed by a snap-on duck canvas closure 32 having a zippered screen window 33, and the rear end portion thereof by a zippered screen door 34 on the inner side and a zippered duck canvas closure on the outer side. These canvas closures 32 and 35 provide for water-tight closure of the end portion of the erected unit and also an insect free, well ventilated interior when the duck canvas closure 35 at the rear thereof is thrown back employing only the screen door 34 as a closure.

With all of its convenience and comforts the entire unit is relatively light in weight thereby making it easy to tow for highway transport and it similarly has a very light hitch weight that does not make necessary headlight adjustment or over-load springs for over the road use.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A vehicular trailer comprising in combination, a wheeled chassis, a trailer body mounted on said chassis, said body having a bed, an upstanding front panel, and a pair of rear panels, the inner end portions thereof being transversely spaced apart, to afford an access opening to the interior of the trailer body, a vertically mounted door hingedly mounted on one of the rear panels to normally close the access opening, an elevated platform in the forward end portion of the trailer body supported by the bed and the front and side panel members, the longitudinal central part of said platform affording a bed frame for a mattress, a pair of storage compartments, one at each side of the bed frame, said compartments being longitudinally shorter than the bed frame section to afford open rear end portion rearwardly of each compartment, the side portions of the elevated platform being longitudinally divided to provide hingedly mounted access doors to the storage compartments, a superstructure hingedly mounted for folding movements on the trailer body, said superstructure comprising a solid unitary panel and a longitudinally divided sectional panel having upper and lower sections hingedly connected along the respective longitudinal meeting edges thereof and mounted to fold downwardly, the upper section upon the lower section, said sectional panel and the solid panel being hingedly connected at the respective upper edge portions thereof and at the respective lower edge portions, one of each upper edge portion of the opposite side panels of the trailer body, latch means on the upper section and the lower section of the divided panel whereby said section may be rendered a solid panel to cooperate with the first noted solid panel to form a pyramidal roof over the trailer body and held so positioned by the said latch means on the divided sectional panel.

2. The structure defined in claim 1 further including downturned edge portions at the outer edges of the solid roof panel of the superstructure affording an open box to house the opposing sectional roof panel of the superstructure when the respective units are lowered onto the trailer body and cooperating latch means on the superstructure and the trailer body to lock the folded superstructure to the trailer body for transport.

References Cited in the file of this patent
UNITED STATES PATENTS

| | | |
|---|---|---|
| 404,101 | McMaster | May 28, 1889 |
| 1,857,081 | Fontaine | May 3, 1932 |
| 2,131,110 | Lynn | Sept. 27, 1938 |
| 2,582,635 | Kipple | Jan. 15, 1952 |
| 2,701,393 | Madsen | Feb. 8, 1955 |
| 2,714,524 | Swiggum | Aug. 2, 1955 |